United States Patent [19]

Hisada

[11] Patent Number: 5,893,424
[45] Date of Patent: Apr. 13, 1999

[54] FOOT BOARD FOR FOUR WHEELED ALL-TERRAIN VEHICLE

[75] Inventor: Kazumasa Hisada, Akashi, Japan

[73] Assignee: Kawasaki Jukogyo Kabushiki Kaisha, Hyogo, Japan

[21] Appl. No.: 08/920,073

[22] Filed: Aug. 26, 1997

[30] Foreign Application Priority Data

Sep. 9, 1996 [JP] Japan .................. 8-260346

[51] Int. Cl.$^6$ .................. B60N 3/06; B62J 25/00
[52] U.S. Cl. .................. 180/90.6; 74/564; 280/291; 296/75
[58] Field of Search .................. 180/90.6, 311; 296/75; 74/564, 512; 280/291

[56] References Cited

U.S. PATENT DOCUMENTS 2,761,329  9/1956  Reed .................. 74/564
4,768,799  9/1988  Millican .................. 280/291

FOREIGN PATENT DOCUMENTS 60-209373  10/1985  Japan .
62-32157   8/1987   Japan .
2-48289    2/1990   Japan .................. 280/291
4-39115    9/1992   Japan .

Primary Examiner—Peter C. English
Attorney, Agent, or Firm—Marshall, O'Toole, Gerstein, Murray & Borun

[57] ABSTRACT

A foot board and brake pedal for a four wheeled all-terrain vehicle of light weight simple structure with an easy braking operation is provided, on which an operator's foot is freely movable during running, by which the operator's foot is protected from mud and water splashed by front wheels. A recessed portion is formed on a foot putting face of the foot board to accommodate the foot stepping portion of the brake pedal below the foot putting face when the braking pedal is stepped down. An opening is formed on a bottom wall of the recessed portion through which the foot stepping portion of the brake pedal can pass at the maximum stepping amount. The foot board is supported on a body frame by an inverted U-shaped bracket covering the arm portion of the brake pedal through a vibration damper member.

4 Claims, 7 Drawing Sheets

1

FOOT BOARD FOR FOUR WHEELED ALL-TERRAIN VEHICLE

FIELD AND BACKGROUND OF THE INVENTION

The present invention relates to a structure of a foot board for a four wheeled all-terrain vehicle having a seat designed to be straddled by an operator and handlebars for steering control, and more particularly to a structure of a plate shaped foot board with a brake pedal provided generally horizontally on one side of a lower portion of a body frame of the vehicle.

A foot rest (a foot placing portion) for the all-terrain vehicle generally has a structure similar to that of a motorcycle, that is, a bar type foot rest attached to a lower member of a body frame to protrude outwardly on both sides, and has a tip portion covered with an elastic material such as rubber. Such a conventional structure, however, has disadvantages that the operator's foot is restricted on the foot rest, and the operator tends to feel fatigue on the foot after the running of long hours, because the position of the operator's foot cannot be changed freely relative to any change in the riding position of the operator, due to the speed of the vehicle or the unevenness of the ground. In addition, the operator's foot is exposed to mud and water splashed by the front wheels.

In order to overcome the disadvantages mentioned above, employment of a plate shaped foot rest, or a foot board made of synthetic resins or metals is proposed. Such a plate shaped foot board, however, needs to provide a foot stepping portion of a brake pedal above a foot resting or putting face of the foot board, which tends to locate much higher above the foot putting face of the foot board with respect to the stepping amount of the brake pedal. As a result, the operator must raise his (her) ankle or heel from the foot resting or putting face of the foot board to perform a braking operation, which is inconvenient compared with the bar type foot rest wherein the foot stepping portion of the brake pedal can be located almost horizontally with respect to the foot putting portion of the foot rest.

Consequently, a plate shaped step board (foot board) provided with a foot rest projection thereon for easier braking operation, is proposed in Japanese Laid-Open Patent Publication No. 60-209373. In such a step board (foot board), however, the position of the operator's foot is still restricted on the projection during running in the same manner as in the bar type foot rest. Therefore, the above mentioned disadvantage is not completely eliminated regarding restricted movability of the operator's foot. In addition, due to a wide plane portion of the plate shaped foot board, weight reduction of the foot board is difficult with respect to the necessity of providing strength and preventing vibration.

As described above, the bar type foot rest has disadvantages in that the operator feels fatigue on the foot after a running of long hours since the position of the operator's foot is restricted, and in that the operator's foot is exposed to mud or water splashed by the front wheels. The plate shaped foot board on the other hand, still has disadvantages in that the braking operation is inconvenient, because the foot stepping portion of the brake pedal is located so high above the foot resting or putting face of the foot board that the operator must raise his (her) ankle or heel from the foot putting face of the foot board to perform a braking operation. In addition, the large plane area of the foot board tends to reduce the rigidity, and weight reduction is difficult with respect to the necessity of providing strength and preventing vibration.

It is accordingly an object of the present invention to provide a foot board for a four wheeled all-terrain vehicle of light weight simple structure and with easy braking operation, by which the operator's foot is protected from mud and water splashed by the front wheels, and on which the position of the operator's foot can be freely changeable during running.

SUMMARY OF THE INVENTION

In order to attain the above mentioned object, the present invention provides a foot board for a four wheeled all-terrain vehicle having a seat designed to be straddled by an operator and handlebars for steering control, formed generally in a plate shape attached to a lower portion of a body frame on both sides, and a foot stepping face of a brake pedal being provided above the foot putting face of the foot board of one side. A recessed portion is formed on the foot putting face of the foot board such that the foot stepping portion of the brake pedal is positioned below the foot putting face of the foot board when the brake pedal is fully stepped down. With this structure, a foot board for a four wheeled all-terrain vehicle with an easy braking operation is obtained, even though it is of a plate shape on which the operator's foot is freely movable, because the height of the foot stepping face of the brake pedal from the foot putting face of the foot board is lowered and the braking operation can be performed without requiring raising of the ankle or heel from the foot putting face.

In addition, the recessed portion is formed with a side wall and a bottom wall. The side wall of the rear side is sloped down forwardly toward a forward portion of the body frame to connect the bottom wall, and an opening is formed in the bottom wall through which the foot stepping portion of the brake pedal can pass. With this structure, the foot stepping portion of the brake pedal can be fully stepped down toward the bottom wall utilizing the rear side wall as a guide, which makes the braking operation easier.

Furthermore, a bracket is provided between the foot board and the lower portion of the body frame. A base portion of the bracket is fastened to an edge portion of the foot board on the body frame side. The bracket extends upward from the base portion and is bent toward the body frame side and downward in an inverted U-shape so as to cover an arm portion of the brake pedal provided on a foot board edge portion on the body frame side. The tip portion of the bracket is supported on the body frame through a damper member. With this simple structure, the operator's foot is prevented from contact with the brake pedal, and further, the foot board is reinforced. Thus, a foot board of light weight, rigid and easy fabrication is obtained.

DETAILED DESCRIPTION OF THE PREFERRED EMBODIMENT

Figure 1:
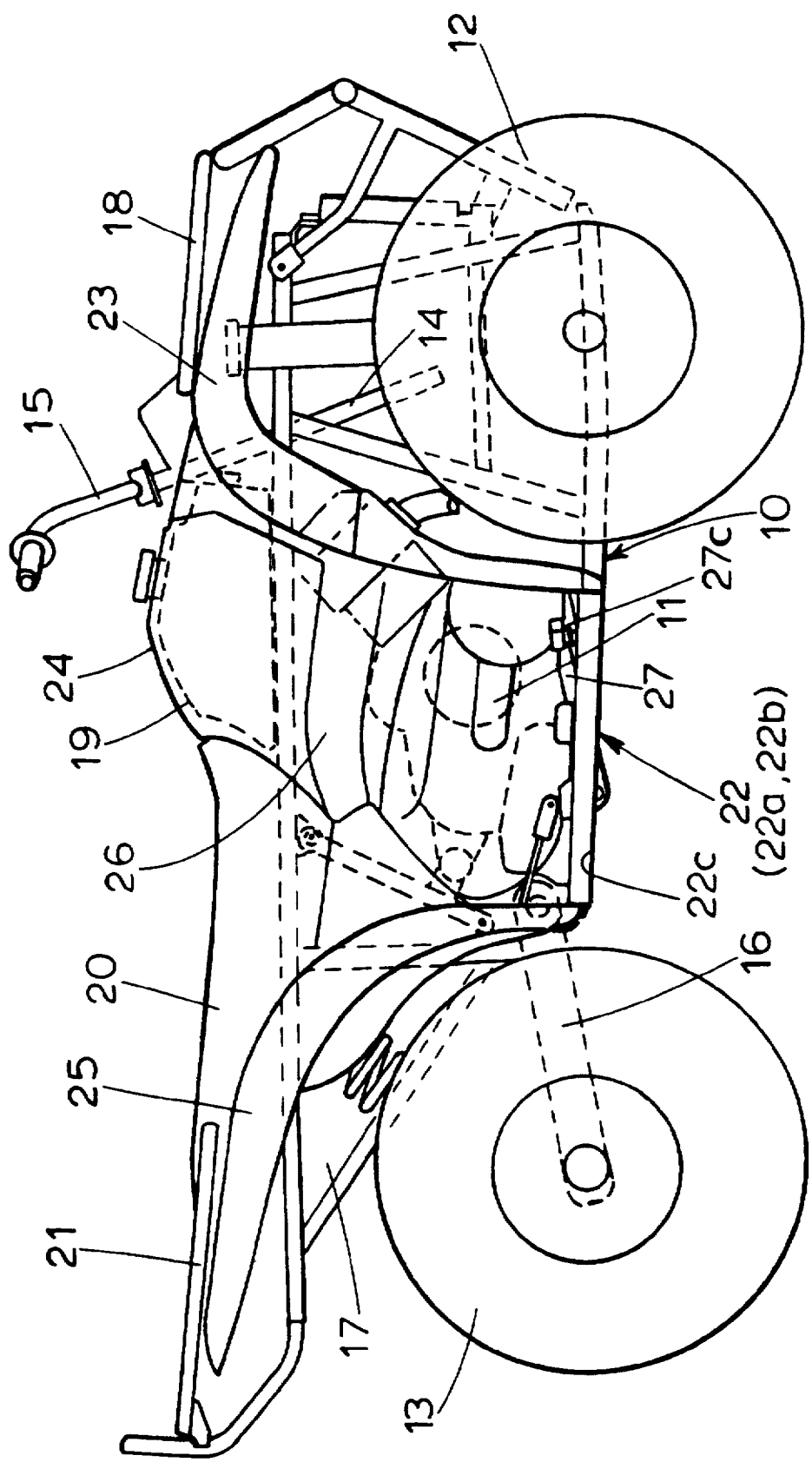
FIG. 1 is a right side view of a four wheeled all-terrain vehicle having a seat designed to be straddled by an operator and handlebar for steering control, to which the present invention is applied.
Figure 2:
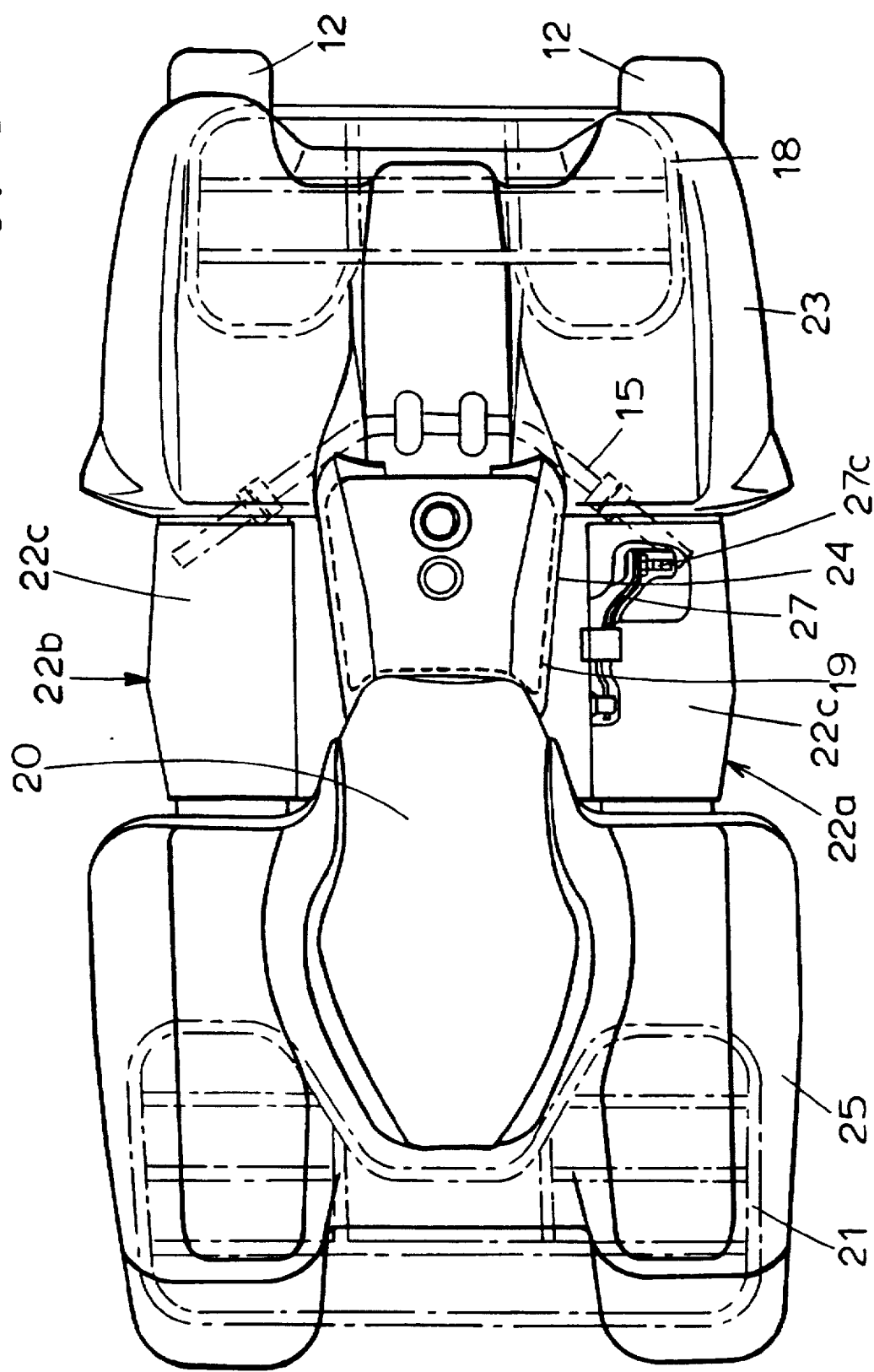
FIG. 2 is a plan view of the straddle type four wheeled all-terrain vehicle of FIG. 1.

A preferred embodiment of the present invention will be described below with reference to the drawings. FIG. 1 is a right side view showing a four wheeled all-terrain vehicle having a seat designed to be straddled by an operator, a handlebar for steering control, and being equipped with a foot board according to the present invention. FIG. 2 is a plan view of the four wheeled all-terrain vehicle of FIG. 1. In FIGS. 1 and 2, an engine 11 is mounted within a central portion of a body frame 10 of a welded pipe structure. Right and left front wheels 12, 12 for steering are mounted on both sides of a front portion of the body frame 10, and right and left rear wheels 13, 13 driven by the engine 11 are mounted on a rear portion of the body frame 10.

A steering shaft 14 extending generally upward is journaled on the front portion of the body frame 10. Handlebars 15 for steering control are fixed to the upper end of the steering shaft 14, and a tie rod (not shown) to steer the right and left front wheels 12, 12 is connected to a lower portion of the steering shaft 14. The right and left front wheels 12, 12 are independently suspended on both sides of the front portion of the body frame 10.

The right and left rear wheels 13, 13 are suspended with a swing arm 16 and with a cushioning unit 17 for supporting loads, and are driven by the engine 11 through a transmission mechanism such as a drive shaft or a drive chain (not shown).

To the upper portion of the body frame 10, a front carrier 18, a fuel tank 19, a seat 20 and a rear carrier 21 are attached from front to the rear. To the front portion of the body frame 10, a front fender 23 is attached for covering the front wheel 12. To the rear portion of the body frame 10, a rear fender 25 is attached for covering the rear wheel 13. Further, on both sides of a lower portion of the body frame 10, a generally plate shaped foot board 22 (22a, 22b) is disposed between the front fender 23 and the rear fender 25. A foot stepping portion 27c of a brake pedal 27 is arranged above the right side foot board 22a, and covers, such as a tank cover 24 and a side cover 26 made of a molded material such as a plastic are removably attached to the body frame 10. The operator straddles on the seat 20, putting his (her) foot on a foot putting face 22c of the foot board 22 (22a and 22b) disposed on each side of the body frame 10, and gripping the handlebars 15 (grip portions thereof) for operating the vehicle. Braking operation is performed by stepping down on the foot stepping face 27a of the brake pedal 27 with a right foot.

Figure 3:
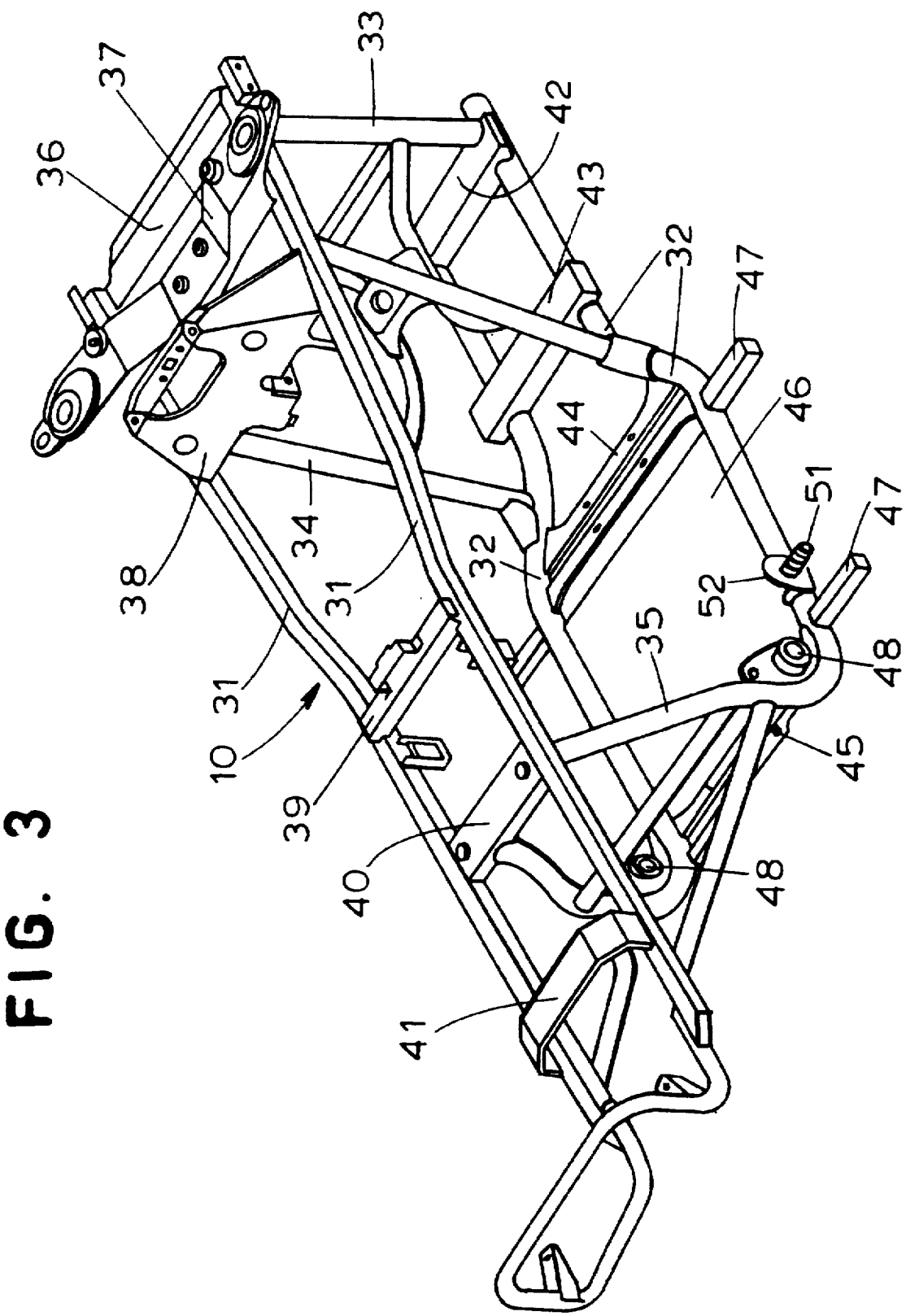
FIG. 3 is a perspective view of a body frame of the vehicle of FIG. 1.

FIG. 3 is a perspective view of the body frame 10 shown in FIG. 1. As shown in FIG. 3, the body frame 10 is composed of a pair of longitudinally extending right and left main upper members 31, 31, a pair of longitudinally extending right and left main lower members 32, 32, a plurality of side members 33, 34 and 35 to connect the main upper members 31 and the main lower members 32 on both right and left sides at a plurality of positions in longitudinally predetermined intervals, a plurality of cross members 36, 37, 38, 39, 40 and 41 to connect the right and left main upper members 31, 31 at a plurality of longitudinally disposed positions, and a plurality of cross members 42, 43, 44, and 45 to connect the right and left main lower members 32 at a plurality of longitudinally disposed positions. Furthermore, the body frame 10 includes an engine guard 46 connected between central portions of the right and left main lower members 32, 32, front and rear step members 47, 47 fastened in pairs on outsides of the right and left main lower members 32, 32, and right and left pivot bearings 48, 48 of a swing arm 16 (FIG. 1) disposed in the rearmost lower end of the right and left side members 35, 35.

Figure 4:
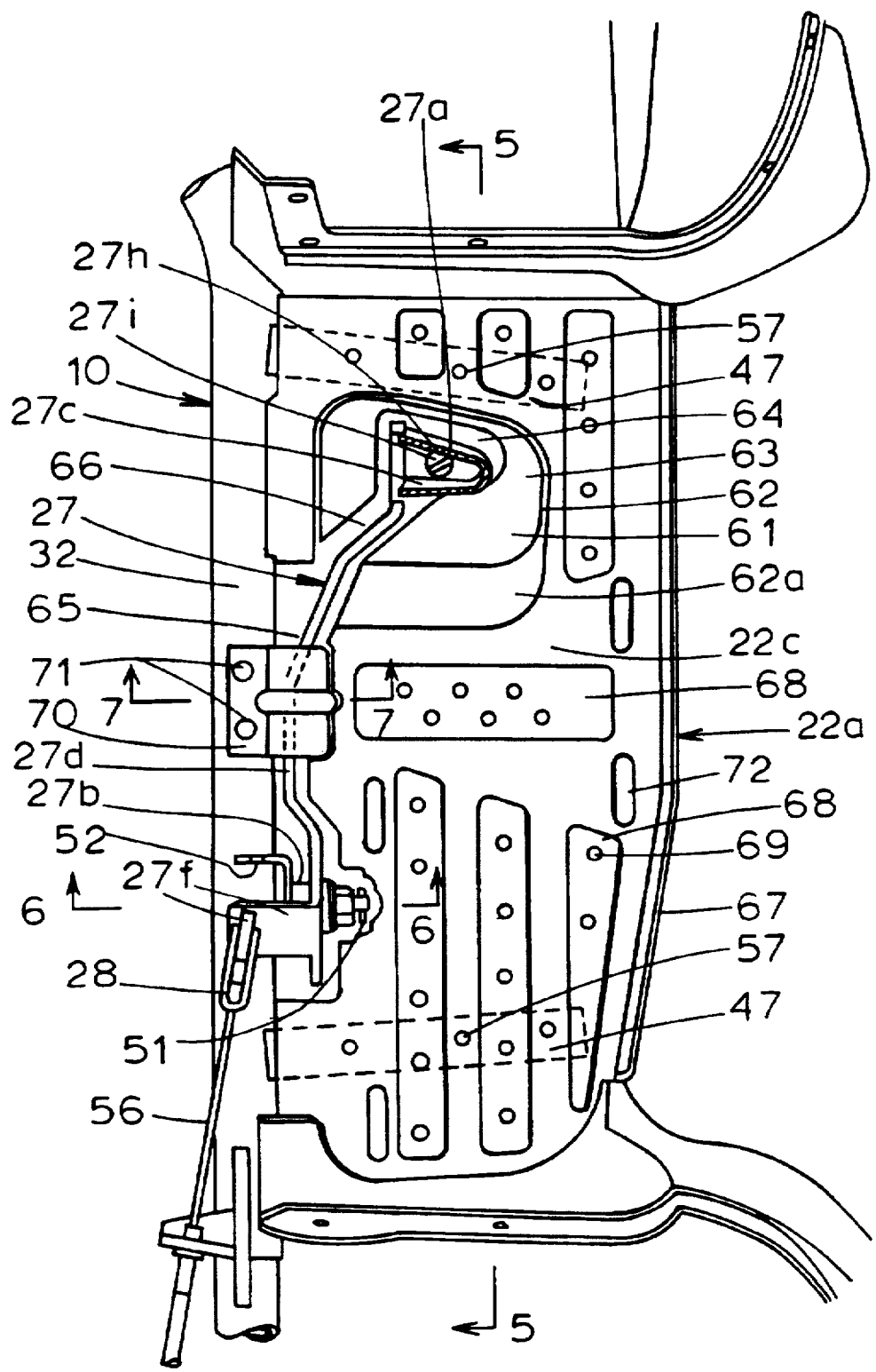
FIG. 4 is a plan view of a foot board portion according to the present invention.
Figure 5:
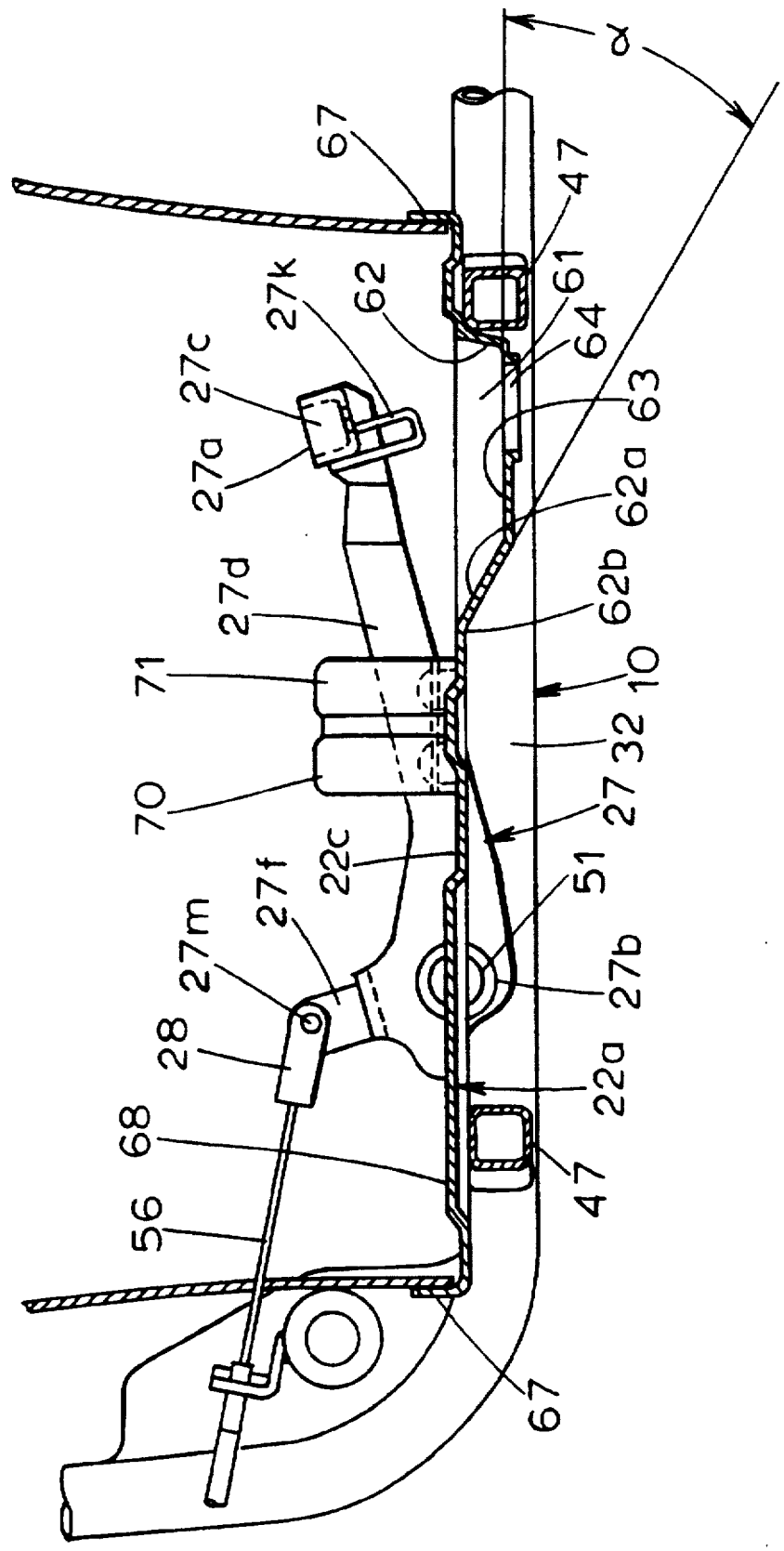
FIG. 5 is a sectional view taken along the line 5—5 in FIG. 4.
Figure 6:
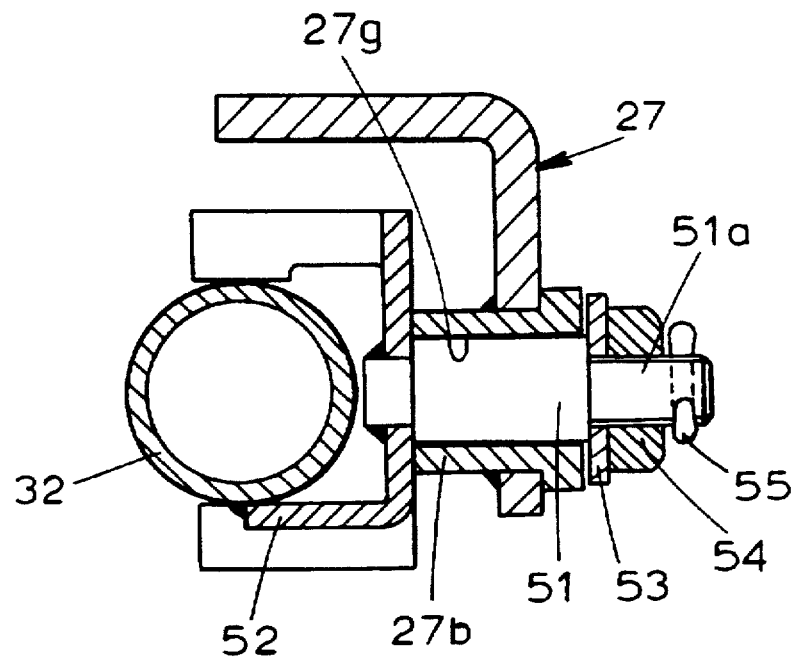
FIG. 6 is a sectional view taken along the line 6—6 in FIG. 4.
Figure 7:
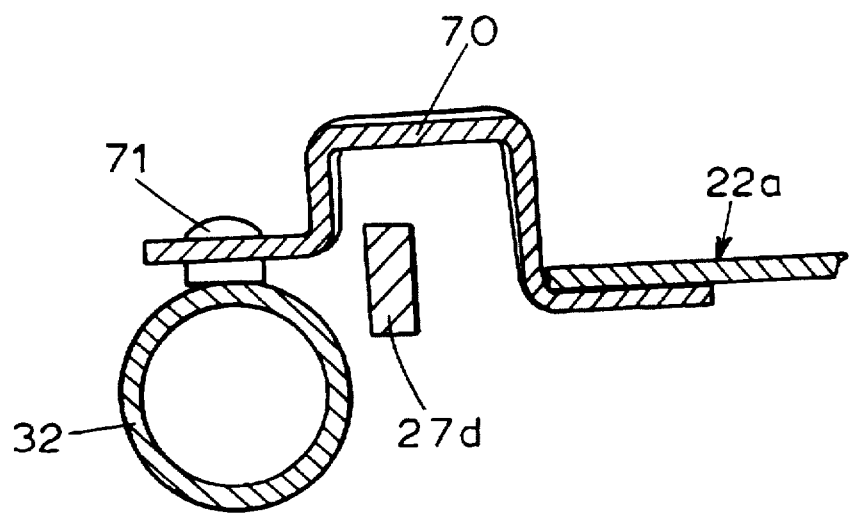
FIG. 7 is a sectional view taken along the line 7—7 in FIG. 4.
Figure 8:
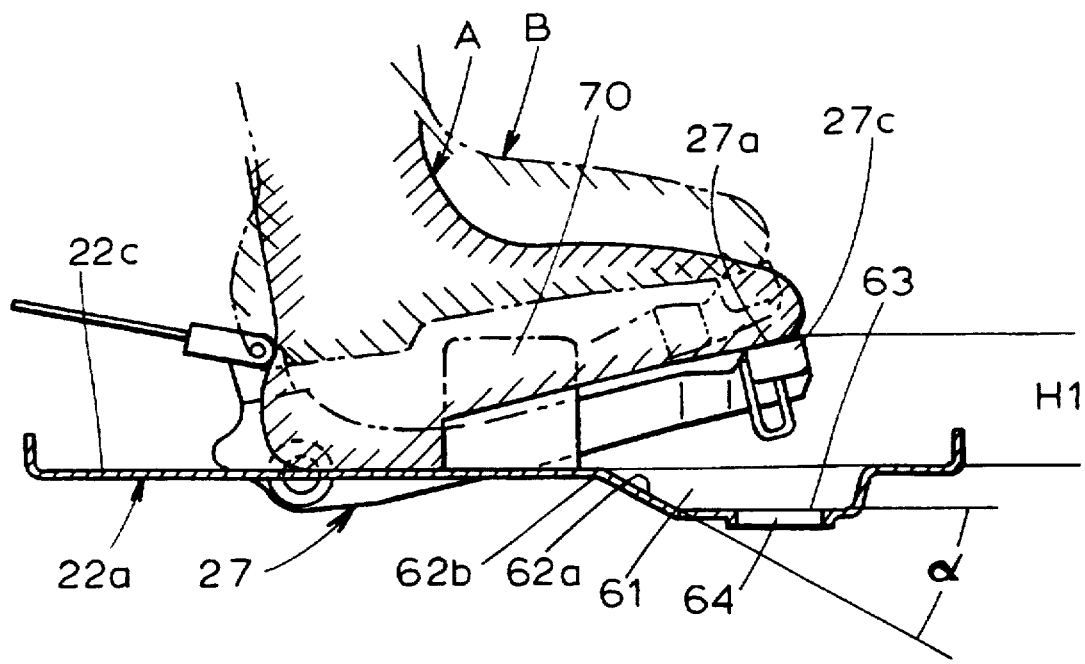
FIG. 8 is a side view showing the start of a braking operation on a foot board according to the present invention.
Figure 9:
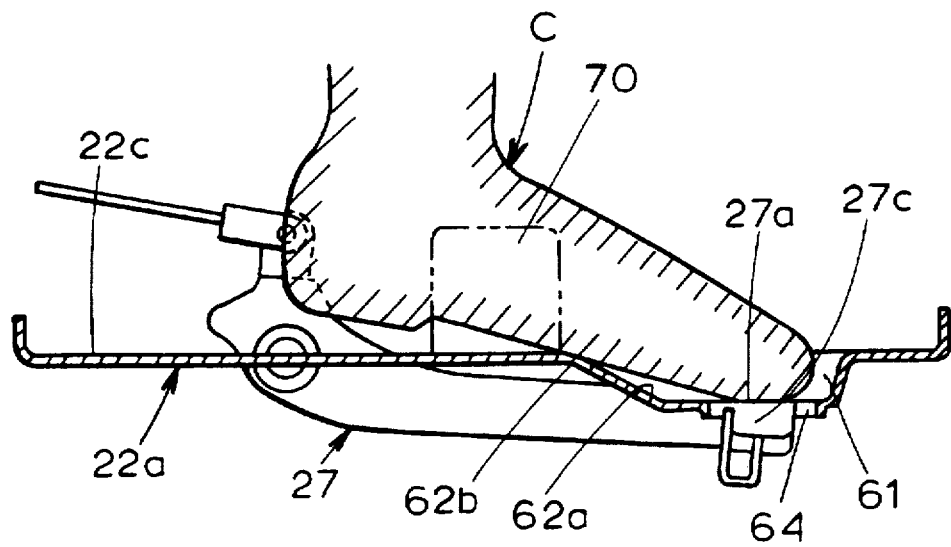
FIG. 9 is a side view showing a braking operation on a foot board according to the present invention.

FIG. 4 is a plan view of a foot board portion according to the present invention. FIG. 5 is a sectional view taken along the line 5—5 in FIG. 4. FIG. 6 is a sectional view taken along the line 6—6 in FIG. 4. FIG. 7 is a sectional view taken along the line 7—7 shown in FIG. 4. FIG. 8 shows the position of the operator's foot at the start of a braking operation according to the present invention (A) and the prior art (B). FIG. 9 shows the position of the operator's foot during the braking operation according to the present invention.

As shown in FIGS. 4, 5 and 6, the brake pedal 27 is integrally formed by a boss 27b serving as a base portion, the foot stepping portion 27c with the foot stepping face 27a on a top face thereof, on which the operator put his (her) foot to perform braking operation, an arm portion 27d connecting the foot stepping portion 27c and the boss 27b, and a lever portion 27f to which a fixture 28 of a braking device (not shown) is connected. A boss hole 27g (FIG. 6) is formed in the boss 27b to serve as a center of rotation of the brake pedal 27.

On the main lower member 32 of the body frame 10, a pin 51 for supporting the brake pedal 27 is disposed between the front and rear step members 47, 47 (a section taken along the line 6—6 in FIG. 4). As shown in FIG. 6, the pin 51 is fixed outwardly of a bracket 52 welded to the outside of the main lower member 32. The boss hole 27g of the brake pedal 27 is rotatably fitted around the pin 51 to allow the brake pedal 27 to rotate at the outside of the main lower member 32. The brake pedal 27 is prevented from falling off by a washer 53, a nut 54 and a split cotter pin 55 disposed on a screwed portion 51a formed on a tip of the pin 51 and having a smaller diameter than the fitting portion.

As shown in FIGS. 4 and 5, the arm portion 27d of the brake pedal 27 extends forward and upward along the outside of the main lower member 32 of the body frame 10, and then extends forward, outward and upward to the foot stepping portion 27c. The foot stepping portion 27c is provided above the center front portion of the foot board 22a at such a height that the operator can perform the braking operation by his (her) tiptoe without raising his (her) heel from the foot putting face 22c (see FIG. 8). The foot stepping portion 27c has a generally U-shaped top view configuration, and is open upward having a bottom, serving an open top face as the foot stepping face 27a on which the operator's foot is placed during the braking operation. A nonskid corrugation 27h is formed on the foot stepping face 27a and a drain hole 27i is provided on the bottom wall for draining mud and water to the ground. Further, a downwardly extending partition 27k of U-shaped wire is attached to a lower portion of the foot stepping portion 27c to prevent the operator's tiptoe from getting into the underside of the foot stepping portion 27c. In stead of the U-shaped wire, the partition 27k may be made simply by a plate.

The lever portion 27f extends upward from the boss 27b, and turns inward covering the boss 27b as far as above portion of the main lower member 32, and further extends upward toward the tip portion where an engagement hole 27m is provided for rotatably receiving a fixture 28 of a wire 56 connected to the braking device (not shown). Thus, by stepping on the foot stepping portion 27c of the brake pedal 27, the brake pedal 27 rotates around the boss hole 27g provided on the boss 27b, and the wire 56 is pulled to actuate the braking device (not shown).

As shown in FIGS. 4 and 5, the right side foot board 22a is supported from below by the front and rear step members 47 fastened to the outside of the right main lower member 32 of the body frame 10, and is secured by screws 57 on the front and rear step members 47. A recessed portion 61 is provided on the front center portion of the foot board 22a at a position corresponding to the foot stepping portion 27c of the brake pedal 27 described above, such that the foot stepping face 27a of the brake pedal 27 is located below the foot putting face 22c or the upper face of the foot board 22a when the brake pedal 27 is fully stepped down (at maximum stepping amount)as shown in FIG. 9. The recessed portion 61 has side walls 62 provided therearound and a bottom wall 63 provided on a bottom thereof. As viewed along the vehicle, a rear side wall 62a is formed to slope down forwardly of the vehicle so as to be connected to the bottom wall 63. An opening 64 which is slightly larger than the foot stepping portion 27c, is provided on the bottom wall 63 such that the foot stepping portion 27c of the brake pedal 27 can go into the opening 64. The shape of downwardly sloping rear side wall 62a may be determined on a human engineering basis with the relationship of a set height of the foot stepping face 27a when the brake pedal 27 is not operated, that is, a height H1 (see FIG. 8) at the beginning of the operation and the necessary maximum stepping amount of the brake pedal. Desirable inclination angle of the rear side wall 62a is about 20 to 60 degrees, and in the present embodiment, this inclination is set to 30 degrees. A rounded portion 62b is provided at the inlet of the recessed portion 61 to serve as a center of rotation of the foot. In the present embodiment, the rounded portion 62b is formed as a circular shape having a radius of 5 mm.

On the foot board 22a, a cut out portion 65 is provided corresponding to the shape of the brake pedal 27 to avoid interference with the arm portion 27d, the boss 27b and the lever portion 27f of the brake pedal 27. The cut out portion 65 is formed forwardly from the boss 27b of the brake pedal 27 on an edge portion of the foot board 22a along a side portion of the main lower member 32. Furthermore, a slotted portion 66 is provided corresponding to the shape of the arm portion 27d of the brake pedal 27 from a front end of the cut out portion 65 toward the opening 64 of the recessed portion 61. An upwardly extending peripheral wall 67 is provided to enclose the front and rear edge and outside edge of the foot putting face 22c of the foot board 22a. Raised portions 68 of 5 mm height are formed on the foot putting face 22c to increase rigidity and on which antiskid holes 69 are provided. A small hole 72 for draining rain water and the like is provided on the foot putting face 22c.

According to the foot board 22a of the present invention as described above, the foot stepping face 27a of the brake pedal 27 is located below the foot putting face 22c of the foot board 22a at the maximum stepping position of the brake pedal 27. Consequently, the stepping amount of the brake pedal 27 is assured even when the height H1 (the height at the beginning of the operation) of the foot stepping face 27a of the brake pedal 27 is set at the height that the braking operation can be performed without raising the operator's heel. Accordingly, the operator need not raise his (her) ankle or heel from the foot putting face 22c for performing the braking operation as in the prior art as shown by foot position B in FIG. 8, compared to the foot position A in the present invention. Thus, the braking pedal operation can be performed easily and surely (see FIGS. 8 and 9). Furthermore, since the plate shaped foot board 22a has substantially no projection thereon for the braking operation, the operator's foot is freely movable over the foot board. In addition, since the rear side wall 62a of the recessed portion 61 is sloped down forwardly and since the rounded portion 62b is provided at the inlet of the recess 61, the braking operation can be performed more easily, by rotating foot around the rounded portion, making use of the wall face as a guide.

Since the opening 64 is provided on the bottom wall 63 through which the foot stepping portion 27c of the brake pedal 27 can pass, the set height H1 (see FIG. 8) of the foot stepping face 27a can be lowered making the braking pedal operation more easy. In the present embodiment, the plate shaped foot board 22 according to the present invention is provided between the front fender and rear fender, thus, the operator's foot is effectively protected form mud and water splashed by the front wheels. The opening 64 in the recessed portion 61 is formed only slightly larger than the foot stepping section 27c to permit the foot stepping portion 27c to pass, and thus the opening 64 does not cause any serious problem against the splashed mud and water.

With the brake pedal 27 and the foot board 22a of the above mentioned structure, the arm portion 27d of the brake pedal 27 is protruded upward from the foot putting face 22c of the body frame side of the foot board 22a, in the middle portion and the foot board 22a is of a plate shape having a cut out portion, it is preferable to support the foot board 22a with a bracket 70 such as described below. The bracket 70 according to the present embodiment will be described below in detail with reference to the drawings.

As shown in FIGS. 4 and 5, the bracket 70 is provided between the foot board 22a and the main lower member 32 of the body frame 10 at the middle portion in the longitudinal direction of the foot board 22a where the arm portion 27d of the brake pedal 27 is protruded above the foot putting face 22c of the foot board 22a. As shown in FIG. 7, the bracket 70 extends upward from the base portion fastened to the body frame side edge of the foot board 22a, and is bent inward covering the arm portion 27d of the brake pedal 27 protruded above the foot board 22a, and is bent downward forming an inverted U-shape and further bent inward so that the tip portion of the bracket 70 faces the main lower member 32 from above. Two vibration dampers 71 are provided on the tip portion of the bracket 70 to abut the upper face of the main lower member 32. Although the number of the vibration damper members 71 is two in the present embodiment, it may be one, or three or more depending upon the size of the damper material and the like to obtain the same vibration dampering effects.

According to this foot board supporting structure, a comfortable foot board is obtained because the middle portion of the arm portion 27d of the brake pedal 27 is covered with the bracket 70 and the direct contact of the operator's foot to the arm portion 27d of the brake pedal 27 is prevented. Furthermore, because the foot board 22a is supported on the main lower member 32 by the bracket 70 through dampers 71, the foot board 22a of light weight, less vibration and less deflection is obtained even if the foot board is formed in the plate shape and having the cut out portion 65, the slot 66 or the opening 64.

What is claimed is:

1. A foot board and brake pedal for a four wheeled all-terrain vehicle, said vehicle having a seat designed to be straddled by an operator, handlebars for steering control, a body frame, and a brake pedal mounted on one side of a lower portion of said body frame, said foot board disposed on said one side of said body frame with the brake pedal; said foot board and brake pedal comprising:

said foot board formed generally in a plate shape and having a forward central portion and a foot putting face rearward of said forward central portion;

said brake pedal including a foot stepping face being provided above the forward central portion of said foot board; and a recessed portion formed on said foot board such that said foot stepping face of the brake pedal is positioned below the foot putting face of said foot board at a maximum stepping position of the brake pedal.

2. A foot board and brake pedal for a four wheeled all-terrain vehicle according to claim 1, wherein said recessed portion of said foot board is formed by a side wall, a bottom wall, and a rear side wall sloped downwardly and forwardly of the vehicle and connected to the bottom wall, and an opening formed in said bottom wall to enable the foot stepping face of the brake pedal to protrude into said opening.

3. A foot board and brake pedal for a four wheeled all-terrain vehicle according to claim 1, including a cut out formed in the foot board to avoid interference with the brake pedal.

4. A foot board and brake pedal for a four wheeled all-terrain vehicle according to claim 3, including a bracket mounted between the foot board and the lower portion of the body frame, said bracket extending upward from a base portion, bent inward covering the brake pedal and bent downward forming an inverted U-shape toward a tip portion, and vibration dampers mounting said bracket on said body frame.

* * * * *